(12) United States Patent
Lam

(10) Patent No.: US 7,298,120 B2
(45) Date of Patent: Nov. 20, 2007

(54) APPARATUS, AND ASSOCIATED METHOD, FOR CONVERTING ELECTRICAL POWER INTO FORM FOR POWERING A LOAD DEVICE

(75) Inventor: Man Lung Lam, Tai Po (HK)

(73) Assignee: Radio Shack Corporation, Fort Worth, TX (US)

( * ) Notice: Subject to any disclaimer, the term of this patent is extended or adjusted under 35 U.S.C. 154(b) by 276 days.

(21) Appl. No.: 11/126,804

(22) Filed: May 11, 2005

(65) Prior Publication Data

US 2006/0256594 A1    Nov. 16, 2006

(51) Int. Cl.
G05F 1/565 (2006.01)
G05F 1/614 (2006.01)

(52) U.S. Cl. .................. 323/272; 323/284; 323/299; 363/65

(58) Field of Classification Search .............. 323/225, 323/268, 271, 272, 282, 284, 299, 300; 363/65
See application file for complete search history.

(56) References Cited

U.S. PATENT DOCUMENTS

| | | | |
|---|---|---|---|
| 5,347,211 A | 9/1994 | Jakubowski | |
| 6,064,177 A | 5/2000 | Dixon | |
| 6,433,274 B1 | 8/2002 | Doss et al. | |
| 6,526,515 B1 | 2/2003 | Charles et al. | |
| 6,639,816 B2 * | 10/2003 | Liu | 363/65 |
| 6,643,158 B2 | 11/2003 | McDonald et al. | |
| 6,650,560 B2 | 11/2003 | MacDonald et al. | |
| 6,690,144 B1 * | 2/2004 | DeNicholas et al. | 323/222 |
| 6,700,808 B2 | 3/2004 | MacDonald et al. | |
| 6,751,109 B2 | 6/2004 | Doss et al. | |
| 6,903,950 B2 | 6/2005 | Afzal et al. | |

* cited by examiner

*Primary Examiner*—Gary L. Laxton

(57) ABSTRACT

A power converter, and an associated method, for converting input power into output power. The power converter is capable of converting direct current input power as well as alternating current input power into direct current output power available for use to power an electrical load device, such as a consumer electronic device. The power conversion is performed at improved levels of efficiency, and less input power is dissipated as thermal energy.

19 Claims, 4 Drawing Sheets

APPARATUS, AND ASSOCIATED METHOD, FOR CONVERTING ELECTRICAL POWER INTO FORM FOR POWERING A LOAD DEVICE

The present invention relates generally to a manner by which to convert input power of input characteristics into power of selected output characteristics suitable for powering a load device, such as a consumer electronic device. More particularly, the present invention relates to apparatus, and an associated method, by which to convert input power of one of several input characteristics into operative power of selected direct-current characteristics, available for use, by way of a connector, to power the consumer electronic, or other, device.

Conversion is made in a manner that exhibits less power loss, thereby improving the efficiency of the power conversion. As less of the input power is converted into thermal energy, a converter of increased longevity is provided as the mean-time-before-failure rates of the circuit components are lengthened as a result of lowered operating temperatures of the converter relative to conventional devices.

BACKGROUND OF THE INVENTION

The use of consumer electronic devices is pervasive throughout modern society. Consumer electronic devices are used to perform many varied functions. Some functions performed by the consumer electronic devices are practical necessities of modem life. And, ready access to, and use of, devices capable of performing such functions is needed.

The electronic devices are formed of electronic circuits that are of any of various constructions, e.g., formed of discrete or integrated circuits. Different circuits exhibit different load characteristics, sometimes identified by their resistive load characteristics. The load characteristics of a device are determinative, in part, of the power requirements required to power the device. While electronic circuitries require direct current power for their operation, the characteristics of the direct current power are device-dependent. And, as a result, different levels of operative power are needed by different devices for their operation.

Power grids forming power infrastructures have been extensively deployed to provide populated areas with electrical power, available for use, inter alia, to power consumer electronic devices. In North America, for instance, power grids provide alternating current power, available at 110 volt levels. Power derived from a power grid permits powering of electronic devices. When the circuitries of the electronic devices are, as noted above, constructed to be operable with direct-current energy, power sourced at the power grid must be converted into a form useable by the electronic devices. When the power grid-sourced energy is of alternating current characteristics, the energy must be converted into direct current energy.

A power converter is used to convert the power grid-sourced energy into energy of characteristics suitable for powering the electronic device. Typically, the circuitry of the electronic device operates at relatively low voltage levels while the grid-sourced energy is of relatively high voltage levels. The power converter both converts the alternating current energy into direct current energy and also down-converts the input energy to a level useable by the electronic device.

Sometimes, the energy source of operative power used to power an electronic device is sourced at a source of direct current energy, e.g., an automotive battery power supply. A power converter is sometimes also required to convert the energy of the direct current power supply into energy of characteristics appropriate to power the electronic device. The power converter operates in manners analogous to those just-described with respect to a grid-sourced power supply to convert the supplied power into energy of characteristics appropriate to power the electronic device.

Some conventional power converters operate only to convert alternating current energy of a selected level into direct current energy. Other conventional power converters operate only to convert direct current energy into direct current energy of other characteristics. And, some power converters are capable of converting both direct current energy and alternating current energy into direct current output energy of characteristics capable of powering a load device.

Power conversion of energy from an input form into an output form is not one hundred percent efficient. That is to say, not all of the input energy is converted into useful output energy. Part of the input energy is, instead, converted into thermal energy, i.e., heat energy. Generation of the heat energy is disadvantageous, not only for the reason that greater amounts of input energy are required so that the output energy is of appropriate power levels, but also for the reason that the heat energy increases the temperature of the components of the power converter, increasing the rate at which the components of the converter fail. The component failure rate is sometimes quantified as a mean-time-between-failure rate.

Some conventional power converters include multiple power conversion stages, each of which exhibits a less than one hundred percent efficiency. When the stages are connected in a cascaded configuration, the reduction in the efficiency of the power converter is compounded. That is, if two different power converter stages are positioned in series, efficiency reductions occur at each of the stages, and the resultant output power is of a twice-reduced level. For instance, if each stage, positioned, in cascade, exhibits an eighty-five percent efficiency, the output at the second stage is seventy-three percent of the input energy. Twenty-seven percent of the input energy is not used, and, instead, is converted into thermal energy. As the thermal energy is dissipated through the elements of the power converter, the temperature levels of the elements of the power converter increase, and the mean-time-between-failure rate of the elements correspondingly increase.

An improved power converter exhibiting improved efficiency is therefore needed.

It is in light of this background information related to power conversion of electrical power energy that the significant improvements of the present invention have evolved.

SUMMARY

The present invention, accordingly, advantageously provides apparatus, and an associated method, by which to convert input power of input characteristics into power of selected characteristics suitable for powering a load device, such as a consumer electronic device.

Through operation of an embodiment of the present invention, a manner is provided by which to convert input power of one of several input characteristics into operative power of selected direct-current characteristics, available for use, by way of a connector, to power the consumer electronic, or other, device.

The power conversion provided pursuant to operation of an embodiment of the present invention is carried out in a manner that is more efficient than conventional power converters operable to convert input power into output power of characteristics that are permitting of powering of a selected load device, such as a consumer electronic device. Lessened levels of loss occur during the conversion of the input power energy into output power energy, thereby increasing the efficiency of the conversion and also reducing the deleterious effects of temperature elevation of the circuit components of the converter resulting from the conversion of a portion of the input power energy into thermal energy. As the thermal energy generated as a byproduct of the power conversion increases the temperature of the circuit components of the power converter, and such temperature increase increases the likelihood of failure of the circuit components, quantified by mean-time-before-failure rate of the circuit components. By more efficiently converting the input energy into output energy, lessened levels of temperature increase occur, and the power converter exhibits greater longevity.

In one aspect of the present invention, the power converter converts alternating current input power into direct current output power. The alternating current power forming the input power is of voltage levels within a selected range of voltage levels, e.g., between 90 and 200 volts. The power converter includes an alternating current-to-direct current converter that converts the alternating current input power into direct current energy of a selected voltage level. The voltage level in to which the input power energy is converted is, e.g., a fixed value for input power of any value within the range of input voltages acceptable for input to the power converter. The alternating current-to-direct current converter exhibits an operating efficiency of a level less that one hundred percent, and heat energy is generated as a byproduct of the conversion. The direct-current energy in to which the alternating current-to-direct current converter converts the input energy is selectably applied to an output port of the power converter by way of a switch element. When the switch element is in a closed position, the energy is shunted to the output port.

A control element including a voltage detector that detects the voltage level of energy, if any, formed as a result of conversions performed by the alternating current-to-direct current converter. If alternating current input energy is provided to the power converter within a range of acceptable input voltage elves, the fixed value of direct current voltage into which the alternating current input energy is converted is detected by the voltage detector. The control element causes the switch element to be in a closed position to shunt the direct-current voltage into which the alternating current input energy is converted to the output port of the power converter. When alternating current energy is not provided to the power converter, the alternating current-to-direct current converter does not perform conversion, and the voltage detector of the control element detects zero volts at the output of the AC-to-DC converter.

When the input power applied to the power converter is direct current power, the voltage detector of the control element operates to detect the voltage level of the direct current input power. That is to say, the voltage level of the direct current power is directly measured while the voltage level of the alternating current power is measured subsequent to its conversion by an alternating current-to-direct current converter. The input power, when of direct current characteristics, is, for instance, of a 12 volt value or of a 24 volt value. When the input power is of a 12 volt level, the voltage detector of the control element detects the 12 volt value and causes the switch element to be in a closed position. And, the input power of the 12 volt magnitude is shunted by the switch element to the output port of the power-converter. When the voltage detector of the control element detects input voltage magnitudes of the direct current input power to be of 24 volts, the control element causes the switch element to be in an open position, and the input power is not shunted directly to the output port of the power converter. The input power is, instead, applied to a direct-current-to-direct current step down converter that steps down the voltage of the input power to a lowered voltage level. The control element causes the step down converter to be operable to perform the step down conversion of the direct current input power to the stepped-down voltage. The step down converter operates at a less than one hundred percent efficiency, and the output energy supplied by the step down converter to the output port of the power converter is of a total energy less than the energy of the input power applied to the power converter.

With input power of any of the aforementioned characteristics applied to the power converter, no more than one power conversion stage is required to form output power at an output port of the converter. Cascading of power conversion stages, each with a less than ideal efficiency is obviated, thereby resulting in more efficient power conversion operations.

In these and other aspects, therefore, a power converter, and an associated method, is provided for converting input power of a selected input power characteristic in to output power of a selected output characteristic. A switch element has an input side and an output side. The input side is coupled to receive at least a representation of the input power that exhibits the selected input power characteristic. The switch element is positionable in a closed position in which the input side and the output side are electrically connected when the representation of the input power exhibits a representation characteristic beyond a threshold. A voltage converter is positioned in parallel with the switch element. The voltage converter has an input side and an output side. The input side is coupled to receive the at least the representation of the input power that exhibits the selected input power characteristic. The voltage converter selectably converts the at least the representation of the input power when selected to be operable.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
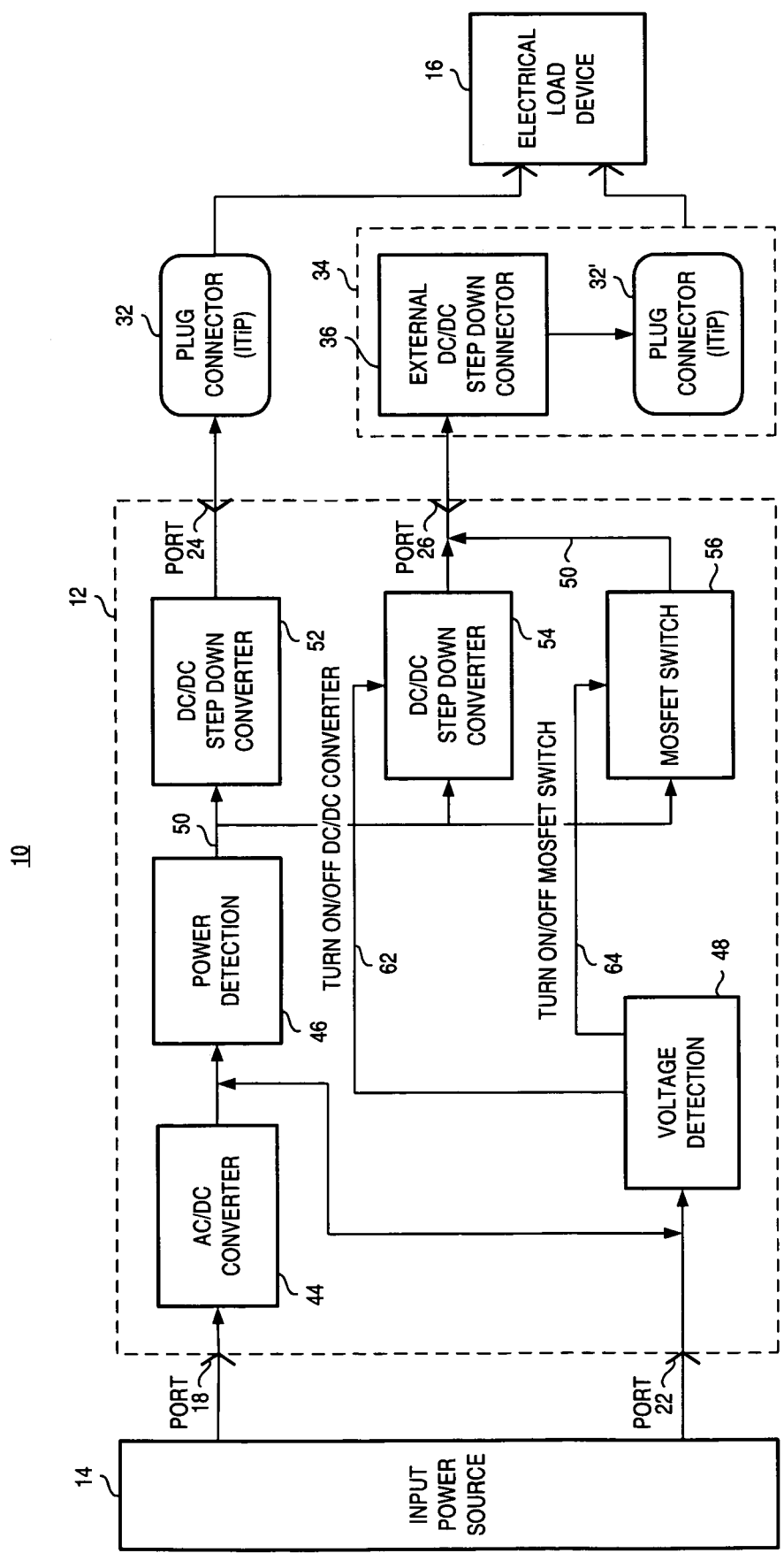
FIG. 1 illustrates a functional block diagram of apparatus including a power converter of an embodiment of the present invention.

FIG. 1 illustrates apparatus 10 that includes a power converter 12 of an embodiment of the present invention. The power converter operates to convert input power sourced at an input power source 14 into output form to facilitate powering of an electrical load device 16.

The load device is, in the exemplary implementation, a consumer electronic device that contains electrical circuitry that, when provided with appropriate levels of operative power, operates to provide the functions or services associated with the consumer electronic device. The following description shall describe an exemplary implementation in which the load device forms the consumer electronic device. In other implementations, however, the power converter provides operative power of characteristics for facilitating powering of other types of load devices. Accordingly, the following description is exemplary only.

In the exemplary implementation, the power converter 12 forms a dual input power converter, capable of converting input power of alternating current characteristics or input power of direct current characteristics. The input power source 14 is here representative of an input power source that sources alternating current energy. The input power source is also representative of a power source that sources direct current energy, the characteristics of which are selectably altered pursuant to operation of the power converter 12.

The power converter here includes dual input ports 18 and 22. The input port 18 forms an alternating current input port operable to receive alternating current energy sourced by the power source 14 such as, e.g., by a plugged connection in a plug-socket combination. And, the port 22 forms a direct current input port connectable to the input power source 14 when the input power source forms a direct current power source that applies direct current energy to the power converter. The input port 22 also forms, e.g., a plugged connector permitting of plugged connection of the input power source thereto, such as by way of a plug-socket combination.

The power converter also includes output ports 24 and 26. The output ports 24 and 26 provide for connections with external elements that, in turn, are connectable to the electrical load device 16. Here, the apparatus includes a plug connector 32 that pluggingly connects with both the output ports 24 and with the load device 16. The plug connector, in the exemplary arrangement shown in the Figure, includes circuitry for setting the output voltage and current levels of the output power that is applied to the electrical load device. And, here, an assembly 34 interconnects the output ports 26 and the load device 16 in an alternate arrangement in which the load device is powered with power generated by the power converter and ported at the output ports 26. The assembly 34 includes a plug member 32' and a direct current-to-direct current step down converter 36. In other implementations, alternate manners are provided by which to interconnect the power converter with the load device.

Operation of the power converter 12 is dependent upon the type of input power provided to the power converter. That is to say, when the input power applied to the power converter is direct current energy, the power converter operates in a first manner. And, when the input power applied to the power converter comprises alternating current energy, the power converter operates in a second manner. And, additionally, when the voltage levels of the input energy are of selected threshold values, operation of the power converter is further dependent upon such voltage levels of the input energy.

The power converter is here shown to be formed of various elements that are functionally represented. The elements are implemented in any desired manner, including a manner in which various of the elements are integrated, in whole or in part, theretogether.

The power converter includes an alternating current-to-direct current converter 44 that is coupled to the input port 18 to receive the input power when the input power source generates alternating current input power. The converter 44, operates to convert the alternating current energy into direct current energy. The conversion is a fixed conversion and, in the exemplary implementation, the conversion is performed at an eighty-five percent efficiency. The fixed conversion rate at which the converter operates to convert the input energy causes the input energy to be converted into a single voltage level, irrespective of the voltage level of the alternating current power applied to the input port 18. In the exemplary implementation, the converter operates to convert input energy of voltage levels between 90 and 200 volts alternating current into a direct current energy of 18 volt levels. The output side of the converter 44 is connected to a power detector 46 and to a voltage detector 48. The power detector operates to detect the power levels of the direct current energy provided thereto. When the input power source provides the alternating current energy to the input port 18, the energy provided to the power detector 46, and also to the voltage detector 48, is of the converted energy into which the converter 44 converts the input power. The power detector operates to detect, and to monitor, the power magnitude of the input power applied to the power converter. An output line 50 extending beyond an output side of the power detector is connected to a direct current-to-direct current step down converter 52, a direct current-to-direct current step down converter 54, and a switch element 56, here a MOSFET switch.

The step down converter 52 operates to step down the voltage level of the energy applied thereto on the line 50 to a selected voltage level, depending upon the characteristics of the converter, between 3.3 and 9.0 volts. And, the converter operates at an eighty-five percent efficiency. In other implementations, the voltage level of the stepped down power into which the converter converts the energy applied thereto is of a different value, including a stepped-up value. The step down converter is coupled to the output port 24, and the stepped-down energy is ported thereat. As the elements 44 and 52 each operate at eighty-five percent efficiency levels, the resultant efficiency of the energy conversion is approximately seventy-two percent at the port 24. That is to say, approximately twenty-eight percent of the input power is not used usefully and is dissipated, e.g., as thermal energy.

The voltage detector 48 operates to detect voltage levels of energy applied thereto. Here, when the input power source is connected at the input port 18 to provide alternating current energy to the power converter, and the converter 44 operates to convert the input power into 18 volt, direct current energy, the voltage detector detects the 18 volt level. The detector 48 includes lines 62 and 64 that extend to the step down converter 54 and the switch element 56, respectively. The detector generates control signals on the respective lines to control operation of the converter 54 and the switch element 56. That is to say, a control signal generated on the line 62 controls whether the converter 54 operates. And, the control signal generated on the line 64 determines the switch position of the switch element 56. In the exemplary implementation, the voltage detector detects whether the voltage level of the energy applied thereto is greater or less than 19 volts. If the detected voltage level is less than 19 volts, the control signals generated by the detector causes the switch position of the switch element to be in the closed position and to cause the step down converter 54 not to be operable. When the switch element 56 is in the closed position, a circuit path is formed to extend between the line 48 and the output port 26. That is to say, as the resistance of the switch element, when in the closed position, is quite low, e.g., less than 1 ohm, the switch element shunts the converters 52 and 54 such that energy formed on the line 50 bypasses the converters 52 and 54 and is provided directly to the output port 26. As the voltage level of energy into which the converter 44 converts input alternating current power is of a fixed, 18 volt level, when the power converter 12 is provided with alternating current energy, the voltage detector causes the switch element always to be in the closed position during application of the input power. The efficiency of operation of the power converter is eighty-five percent efficient, as minimal loss is exhibited at the power detector and at the switch element.

When the input power source forms a direct current power source, the input power is provided to the power converter by way of the input port 22. In the exemplary implementation, the input power source, when forming a direct current source, generates energy of a 12 volt level or of a 24 volt level. The input energy is provided to the power detector 46 and to the voltage detector 48. The power and voltage detectors 46 and 48 are operable as set forth above. That is to say, the power detector operates to detect and monitor power levels of the input energy. And, the voltage detector operates to detect voltage levels of the input energy and to generate control signals on the lines 62 and 64 in response to the detected voltage levels. The operation of the power converter, when direct current energy is applied at the port 22 is dependent upon the voltage level of the input power.

When the input power is of a 12 volt level, the voltage detector detects the input voltage level and, in the exemplary implementation, determines that the input voltage level is less than the 19 volt threshold level. When the voltage level is less than the 19 volt threshold level, the control signal generated on the line 64 causes the switch element to be in the closed position. The input power is shunted by the switch element.

That is to say, the voltage detector, when provided with direct current power by way of the input port 22 of a voltage level of less than the threshold level, i.e., 19 volts, causes the down converter 54 to be turned off and the switch to be turned on. In this implementation, the output energy at the output port 26 is caused to correspond to the input voltage level with minimal attenuation. In this operating condition, the efficiency of power conversion is eighty-five percent at the output port 24 and close to one-hundred percent at the output port 26.

When the voltage level of the direct current input energy applied at the input port 22 is 24 volts, the input voltage level is greater than the threshold of 19 volts used by the voltage detector for purposes of comparison. In one implementation, the results of the comparison causes the voltage detector to generate control signals on the lines 62 and 64 to cause operation of the down converter 54 and opening of the switch element 56. Down conversion is caused to be performed by the down converter to down-convert the voltage level of the input voltage to an output voltage level, e.g., 19 volts. The voltage, down converted by the down converter 52, is again between 3.3 and 9 volts. The efficiencies of power conversions at the output ports 24 and 26 are both, in the exemplary implementation, approximately eighty-five percent as each of the converters 52 and 54 are operable at eighty-five percent efficiencies.

As the power converter converts input power into output power at eighty-five percent or close to eighty-five percent efficiencies, improved efficiency of operation of the power converter is provided relative to conventional operation.

Alternate logical operation is also possible. That is to say, in another implementation, the switch opens when the voltage is less than a threshold, e.g., the nineteen volt threshold, and closes when the voltage is greater than the threshold. Corresponding change in the logic of operation of the power converter is further entailed so that the converter operates as desired.

Figure 2:
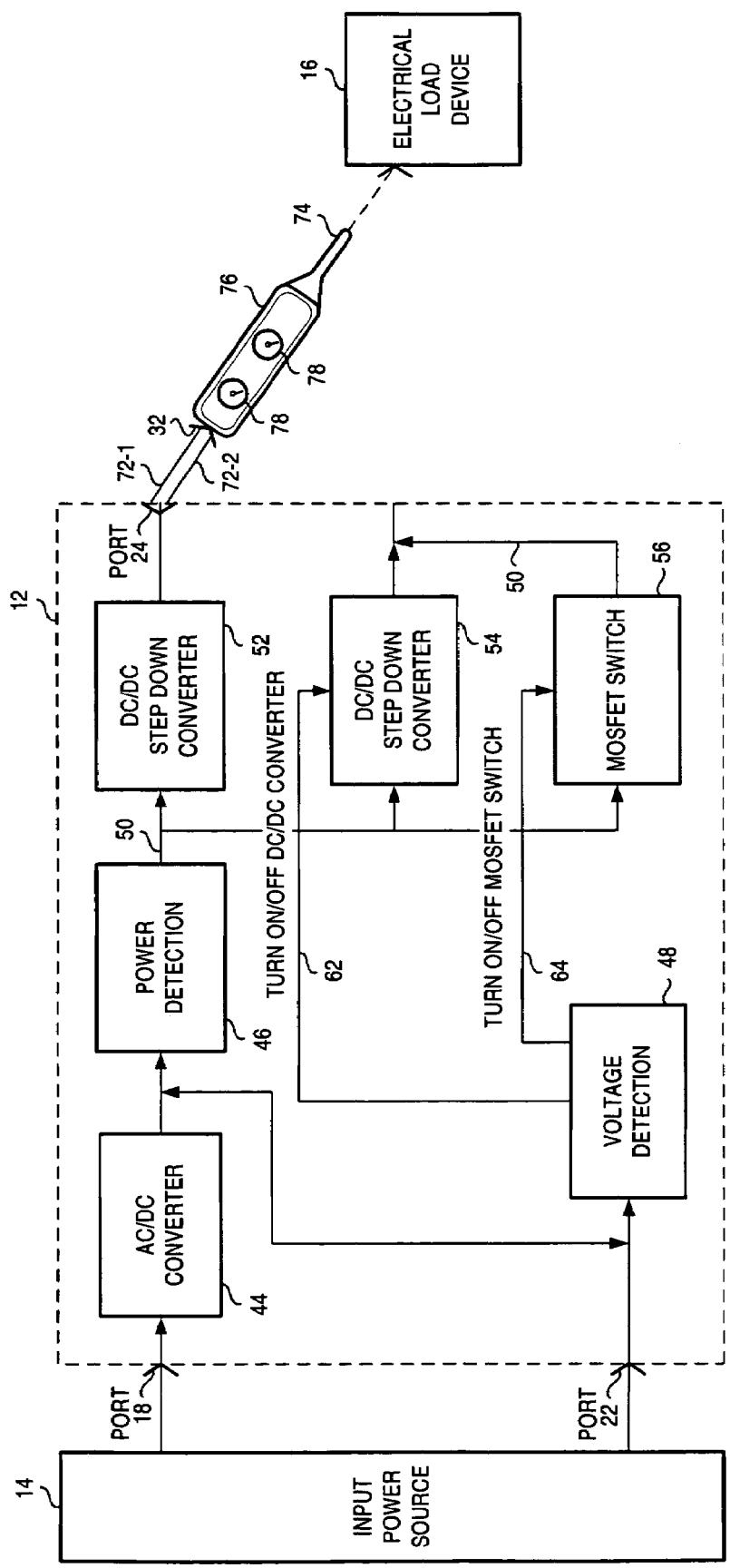
FIG. 2 illustrates a partial functional block, partial perspective, representation of the apparatus shown in FIG. 1.

FIG. 2 again illustrates the power converter 12 positioned to convert input power sourced at the input power source into output power energy that is used to power the electrical load device 16. Here, the electrical load device is powered with output power ported at the output port 24 to which the plug connector 32 is electrically connected. The plug connector is here shown to be connected to the output port 24 by way of the lines 72-1 and 72-2. The plug connector includes a plug member 74 that pluggingly engages with the electrical load device 16 with a corresponding connector element (not shown) formed at the load device. The plug connector 32 of the exemplary implementation includes a housing piece 76 at which voltage and current setting circuit elements are embodied. The plug connector 32 also includes selector dials 78, the positions of which are used to select the output voltage and current levels supplied at the plug 74. As the voltage levels available at the output port 24 are between 3.3 and 9 volts in the exemplary implementation, the selections available at the selector dials 78 are responsive thereto.

Figure 3:
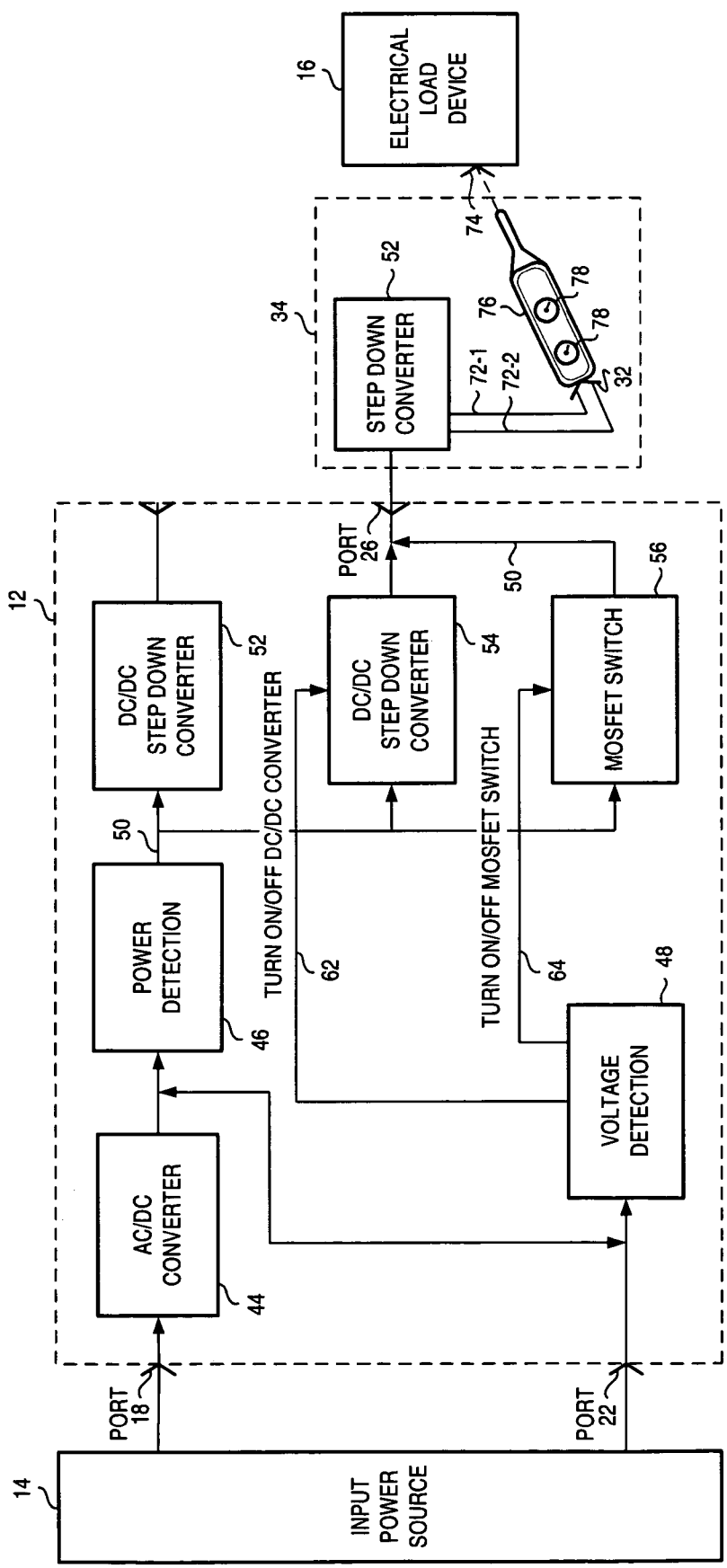
FIG. 3 illustrates a partial functional block, partial perspective view, similar to that shown in FIG. 2, but of another arrangement pursuant to which the power converter of an embodiment of the present invention is operable.

FIG. 3 also illustrates the power converter 12 positioned to convert input power sourced at the input power source into output power. Here, the output power that powers the electrical load device 16 is provided at the output port 26, and the assembly 34 is positioned at the output port and operates to power the electrical load device with the output power provided at the output port. Again, the plug connector 32 forms part of the assembly 34. The plug connector is again shown to include the lines 72-1 and 72-2, the plug element 74, housing 76, and the selector dials 78.

Figure 4:
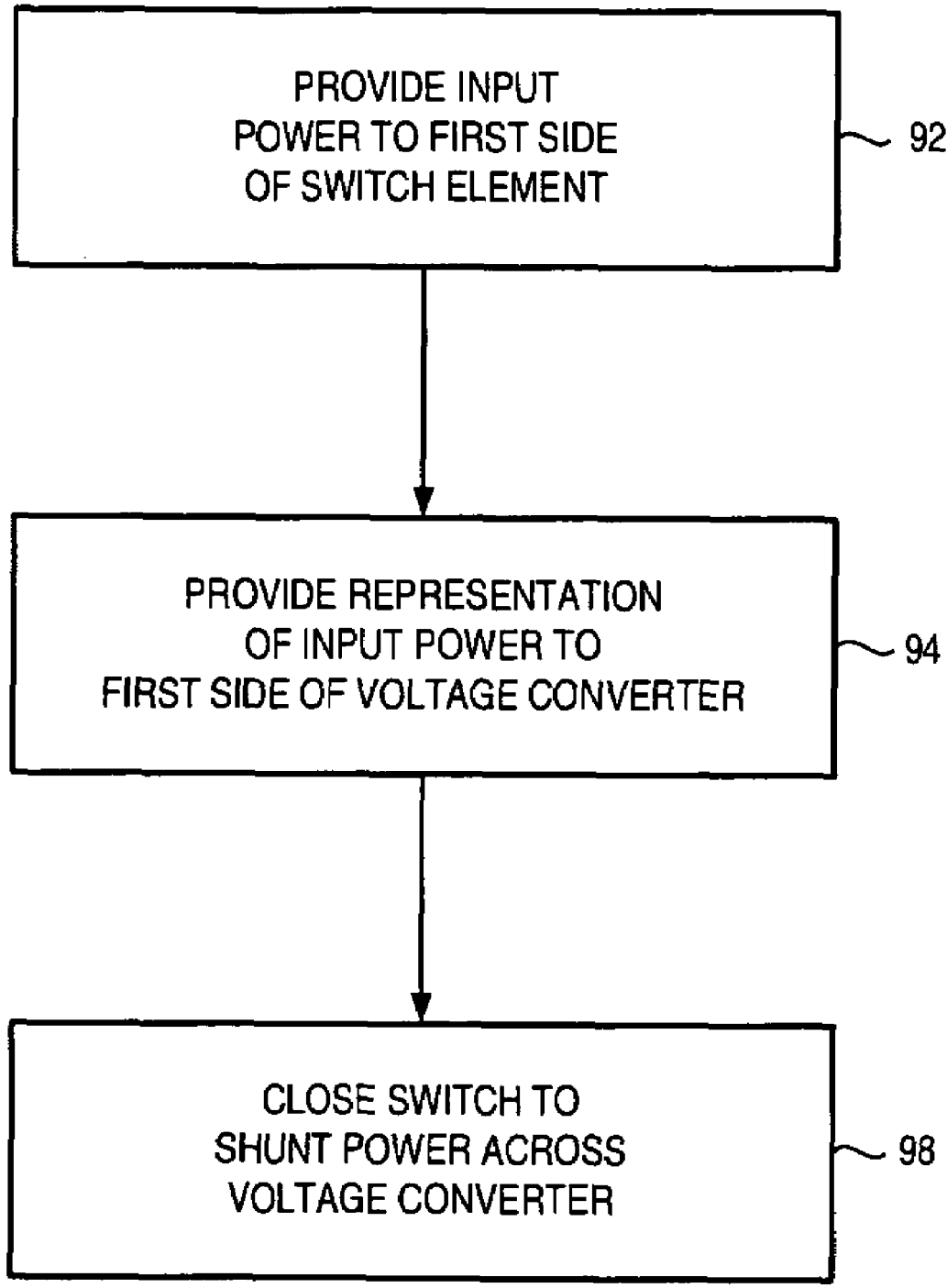
FIG. 4 illustrates a method flow diagram listing the method of operation of an embodiment of the present invention.

FIG. 4 illustrates a method flow diagram, shown generally at 88, representative of the method of operation of an embodiment of the present invention. The method converts input power of a selected input power characteristic into an output power characteristic.

First, and as indicated by the block 92, at least a representation of the input power is provided that exhibits the selected input power characteristic to a first side of a switch element. Then, and as indicated by the block 94, at least a representation of the input power that exhibits the selected input characteristic is provided to a first side of a voltage converter that is connected in parallel with the switch element.

Thereafter, and as indicated by the block 98, the switch element is closed to shunt the representation of the input power that exhibits the selected input power characteristic across the voltage converter to a second side of the switch element when the representation of the input power exhibits a representation characteristic beyond a selected threshold.

Because the power conversion is performed in a manner permitting more efficient conversion, the generation of thermal energy as a byproduct of the power conversion is reduced. The longevity of the elements forming the power converter is increased as the deleterious effects of heating of the elements are less of a problem than that exhibited in conventional power converter circuits.

The previous descriptions are of preferred examples for implementing the invention, and the scope of the invention should not necessarily be limited by this description. The scope of the present invention is defined by the following claims.

I claim:

1. A power converter for converting input power of a selected input power characteristic into output power of a selected output characteristic, said power converter comprising:
   a switch element having an input side coupled to receive at least a representation of the input power that exhibits the selected input power characteristic, and having an output side, said switch element positionable in a closed position in which the input side and the output side are electrically connected when the representation of the input power exhibits a representation characteristic beyond a threshold;
   a voltage converter positioned in parallel with said switch element and having an input side coupled to receive the at least the representation of the input power that exhibits the selected input power characteristic and having an output side, said voltage converter selectably converting the at least the representation of the input power when selected to be operable;
   a detector coupled to said switch element, said detector adapted to receive at least the representation of the input power that exhibits the selected input power characteristic, said detector adapted for detecting whether the selected input power characteristic is beyond the threshold, said detector further for providing a control signal to said switch element to cause said switch element to be closed and the representation of the input power to be shunted across said voltage converter upon detecting that the selected input power characteristic is beyond the threshold and, alternately, said detector further for providing a control signal of a value to cause said switch element to be opened and the representation of the input power to be converted across said voltage converter upon detecting that the selected input power characteristic is not beyond the threshold.

2. The power converter of claim 1 wherein said voltage converter is coupled to said detector to receive indications of detection made by said detector, values of the indications determinative of whether said voltage converter performs conversions of the representation of the input power.

3. The power converter of claim 1 wherein said control signal is a first control signal, said detector further for providing a second control signal to said voltage converter, the first control signal of a value to cause said switch element to be closed and the second control signal to cause said voltage converter to not perform conversions and, alternately, the first control signal of a value to cause said switch element to be opened and the second control signal to cause said voltage converter to perform conversions.

4. The power converter of claim 1 wherein the input power of the selected input power characteristic comprises direct current power of a first selected voltage level, and wherein the representation of the input power of which said switch element is coupled to receive comprises the input power of the first selected voltage level.

5. The power converter of claim 4 wherein the threshold determination of positioning of said switch position comprises a direct-current voltage value and wherein the first selected voltage level is less than the direct-current voltage value, said switch element positioned in the closed position when the first selected voltage level is less than the direct-current voltage value.

6. The power converter of claim 4 wherein the threshold determinative of positioning of said switch position comprises a direct-current voltage value and wherein the first selected voltage level is greater than the direct-current voltage value, said switch element positioned out of the closed position when the first selected voltage level is greater than the direct-current voltage value.

7. The power converter of claim 1 wherein the input power of the selected input characteristic comprises alternating current power of a first selected alternating current level and wherein the representation of the input power of which said switch element is coupled to receive comprises a direct-current-converted power of a first-converted direct current level.

8. The power converter of claim 7 wherein the threshold determinative of positioning of said switch position comprises a direct-current voltage value and wherein the first-converted direct current level is positioned in the closed position when the first-converted direct current level is less than the direct-current voltage value.

9. The power converter of claim 7 further comprising an alternating current-to-direct current converter coupled to receive the input power formed of the alternating current power, said alternating current-to-direct current converter for converting the alternating current power into the direct-current-converted power of the first-converted direct current level.

10. The power converter of claim 9 wherein the first-converted direct current level comprises a fixed level when the first selected alternating current is within a selected range of values.

11. The power converter of claim 1 wherein the output side of said switch element and the output side of said voltage converter are commonly connected.

12. The power converter of claim 11 wherein the input side of said switch element and the input side of said voltage converter are commonly connected, said switch element shunting the input sides of said switch element and said voltage converter together with the output sides of said switch element and said voltage converter.

13. A method for converting input power of a selected input power characteristic into output power of a selected output characteristic, said method comprising the operations of:
   providing at least a representation of the input power that exhibits the selected input power characteristic to a first side of a switch element;
   providing at least the representation of the input power that exhibits the selected input power characteristic to a first side of a voltage converter that is connected in parallel with the switch element;
   detecting whether the selected input power characteristic is beyond a threshold;
   upon detecting that the selected input power characteristic is beyond the threshold, providing a control signal to the switch, element causing the switch, element to be closed and shunting the representation of the input power that exhibits the selected input power characteristic across the voltage converter to a second side of the switch element; and
   upon detecting that the selected input power characteristic is not beyond the threshold, providing a control signal of a value causing the switch element to be opened and the input power that exhibits the selected input power characteristic to be converted across the voltage converter.

14. The method of claim 13 wherein the input power comprises alternating current power of a first alternating current level, wherein the representation of the input power comprises a direct-current-converted power of a first-converted direct current level, and wherein said method further comprises the operation, prior to said operations of providing, of converting the alternating current to the direct-current-converted power.

15. The method of claim 14 wherein the first-converted direct current level is of a fixed value when the first alternating current level of the alternating current power is within a selected range.

16. The method of claim 15 wherein the selected threshold used during said operation of closing comprises a direct-current voltage value.

17. The method of claim 16 wherein the fixed value of which the first-converted direct current level exhibited by the first-converted direct current level is of a value less in magnitude than the direct-current voltage value.

18. The method of claim 13 wherein the input power comprises a direct current power of a first selected voltage level, wherein the representation of the input power comprises a direct-converted power of a first-converted direct current level.

19. A power converter for converting input power of a selected input power characteristic into output power of a selected output characteristic, said power converter comprising:

a switch element having an input side coupled to receive at least a representation of the input power that exhibits the selected input power characteristic, and having an output said side, said switch element positionable in a closed position in which the input side and the output side are electrically connected when the representation of the input power exhibits a representation characteristic beyond a threshold;

a voltage converter positioned in parallel with said switch element and having an input side coupled to receive the at least the representation of the input power that exhibits the selected input power characteristic and having an output side, said voltage converter selectably converting the at least the representation of the input power when selected to be operable; and a detector adapted to receive at least the representation of the input power that exhibits the selected input power characteristic, said detector for detecting whether the selected input power characteristic is beyond the threshold, wherein said detector is coupled to said switch element and to said voltage converter, said detector further for providing a first control signal to said switch element and a second control signal to said voltage converter, the first control signal of a value to cause said switch element to be closed and the second control signal to cause said voltage converter to not perform conversions and, alternately, the first control signal of a value to cause said switch element to be opened and the second control signal to cause said voltage converter to perform conversions.

* * * * *